Figure 1:
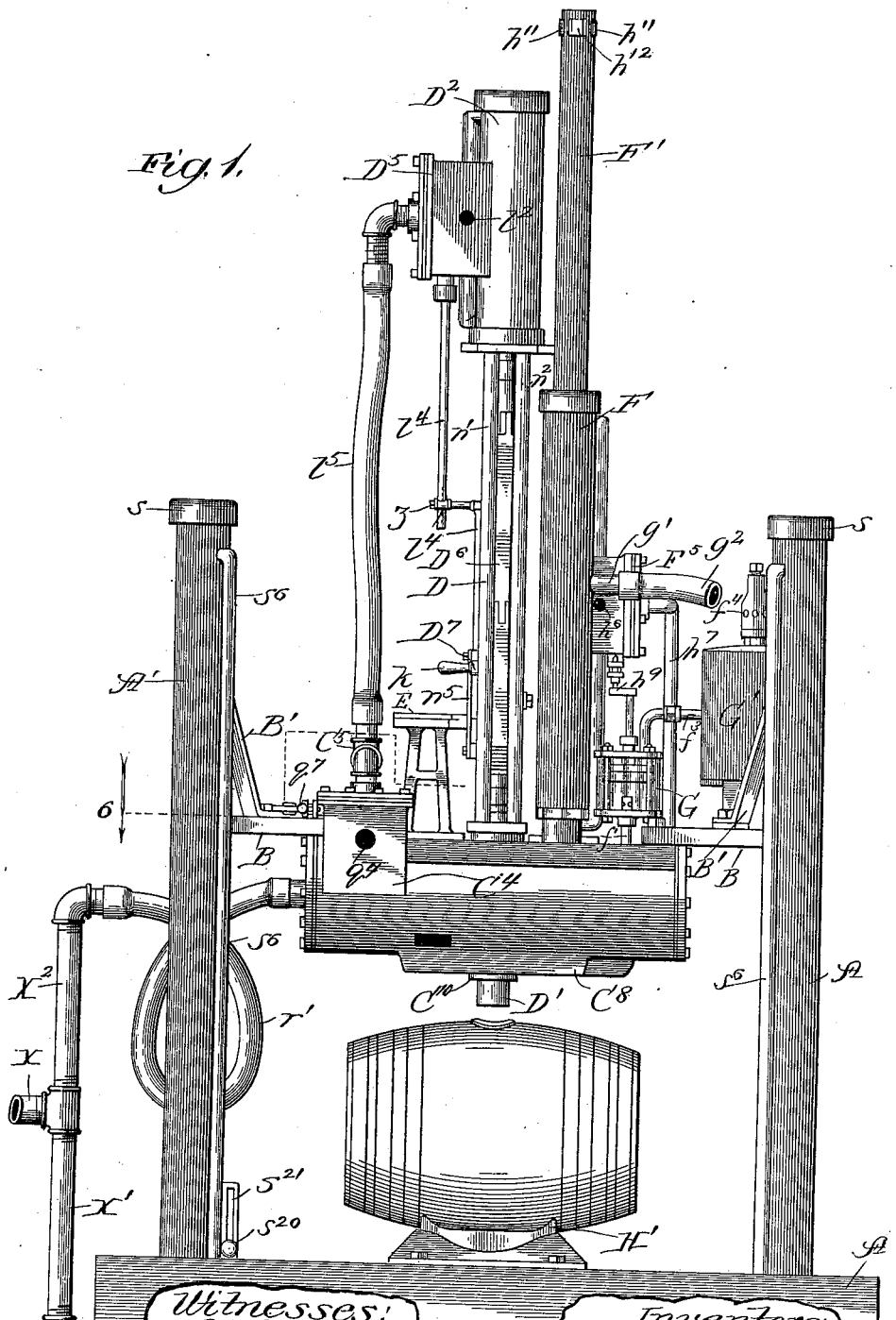

No. 656,278. Patented Aug. 21, 1900.
H. A. & R. C. WHITE.
FILLING MACHINE.
(Application filed Apr. 20, 1896.)
(No Model.) 8 Sheets—Sheet 1.

Witnesses:
Chas. C. Gaylord,
Luth. J. Potter

Inventors:
Henry A. White,
Royal C. White,
By Dyrenforth & Dyrenforth,
Attys.

No. 656,278. Patented Aug. 21, 1900.
H. A. & R. C. WHITE.
FILLING MACHINE.
(Application filed Apr. 20, 1896.)
(No Model.) 8 Sheets—Sheet 2.
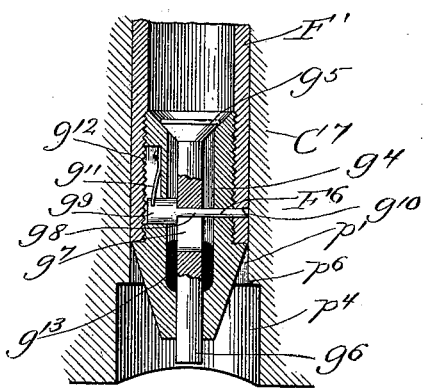
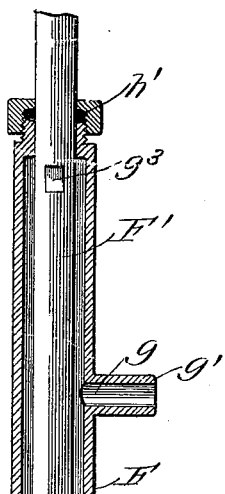
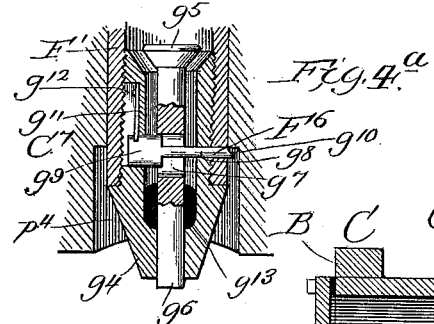
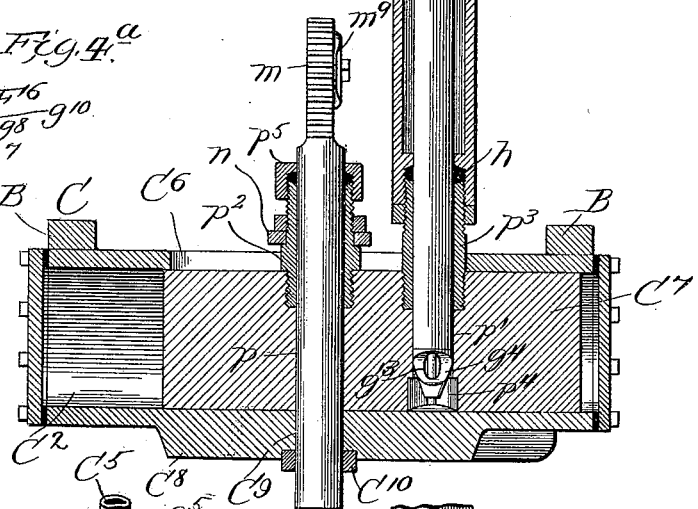
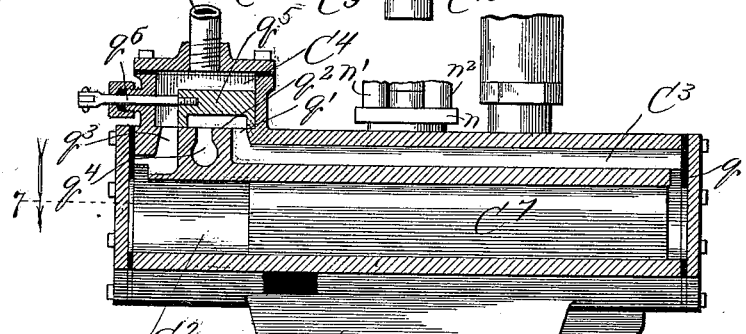
Witnesses:
Inventors:
Henry A. White, and
Royal C. White,
By Dyrenforth & Dyrenforth
Att'ys
THE NORRIS PETERS CO., PHOTO-LITHO., WASHINGTON, D. C.

No. 656,278. Patented Aug. 21, 1900.
H. A. & R. C. WHITE.
FILLING MACHINE.
(Application filed Apr. 20, 1896.)
(No Model.) 8 Sheets—Sheet 3.
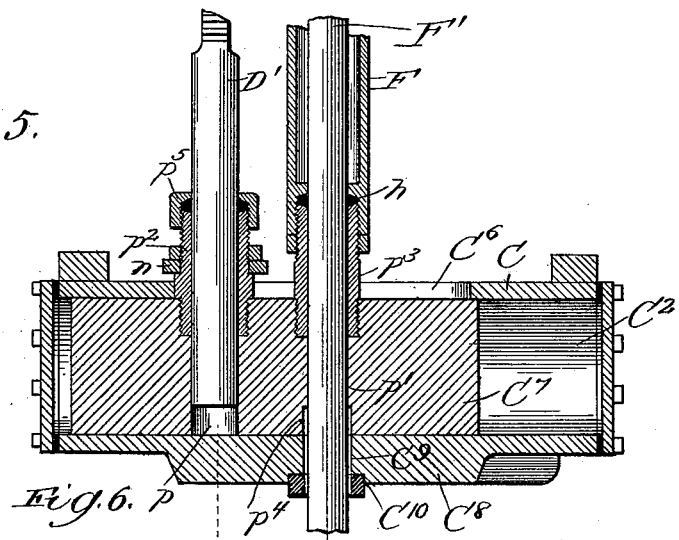
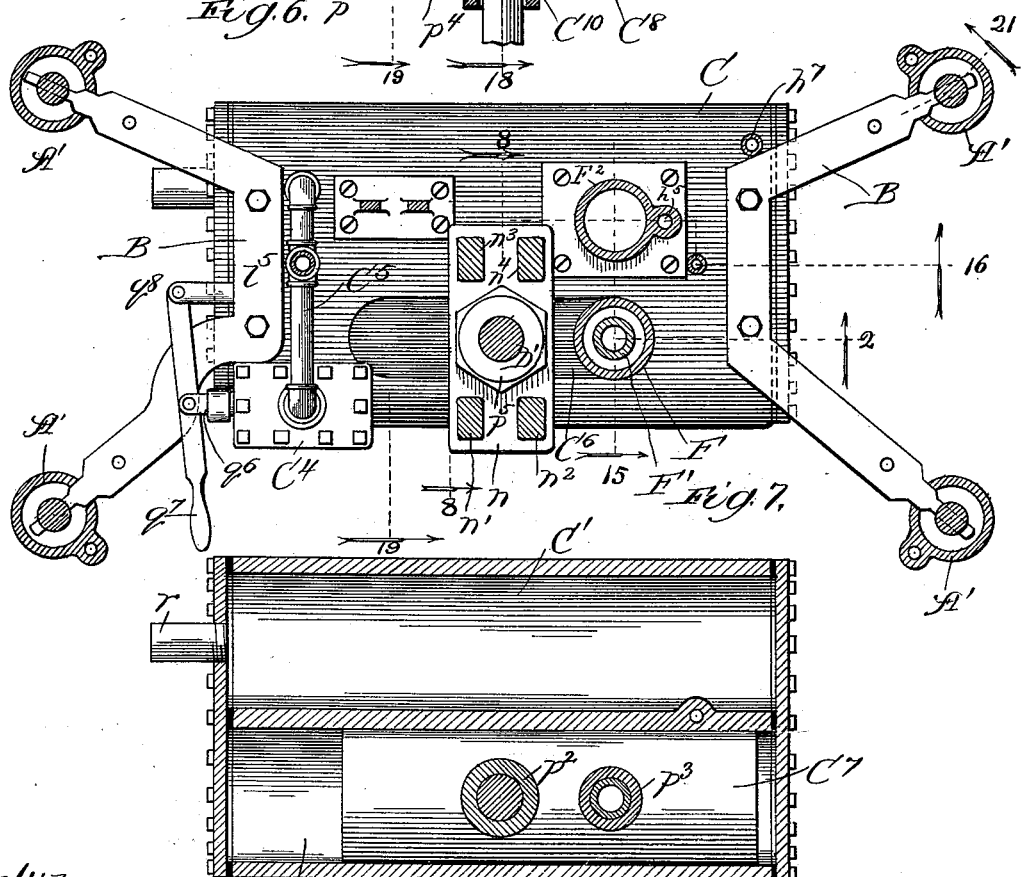

No. 656,278. Patented Aug. 21, 1900.
H. A. & R. C. WHITE.
FILLING MACHINE.
(Application filed Apr. 20, 1896.)
(No Model.) 8 Sheets—Sheet 4.
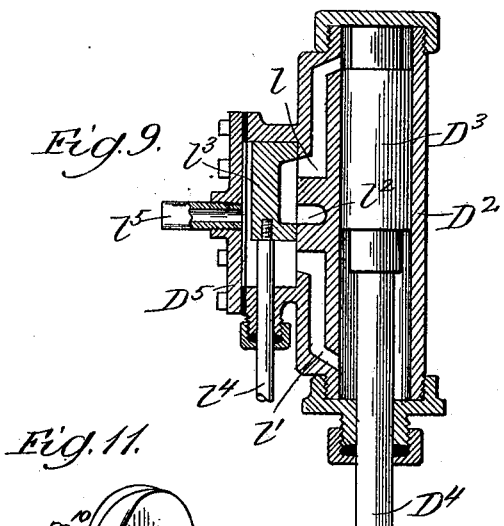
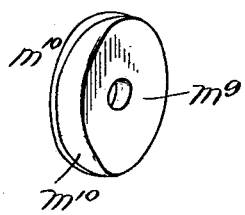
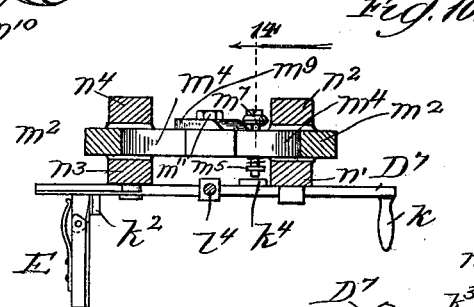
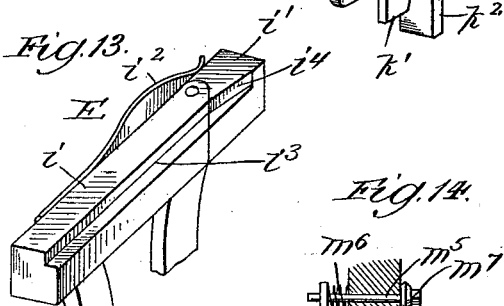
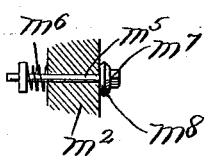
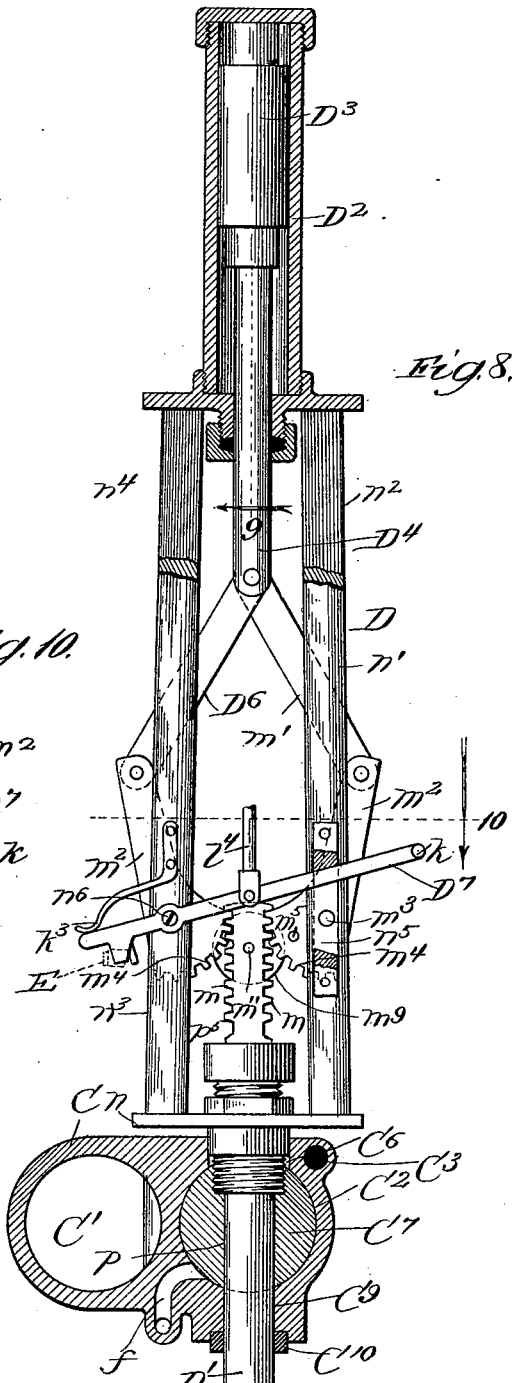
Witnesses:
Inventors:
Henry A. White,
Royal C. White,
By Dyrenforth & Dyrenforth
Att'ys No. 656,278. Patented Aug. 21, 1900.
H. A. & R. C. WHITE.
FILLING MACHINE.
(Application filed Apr. 20, 1896.)
(No Model.) 8 Sheets—Sheet 5.
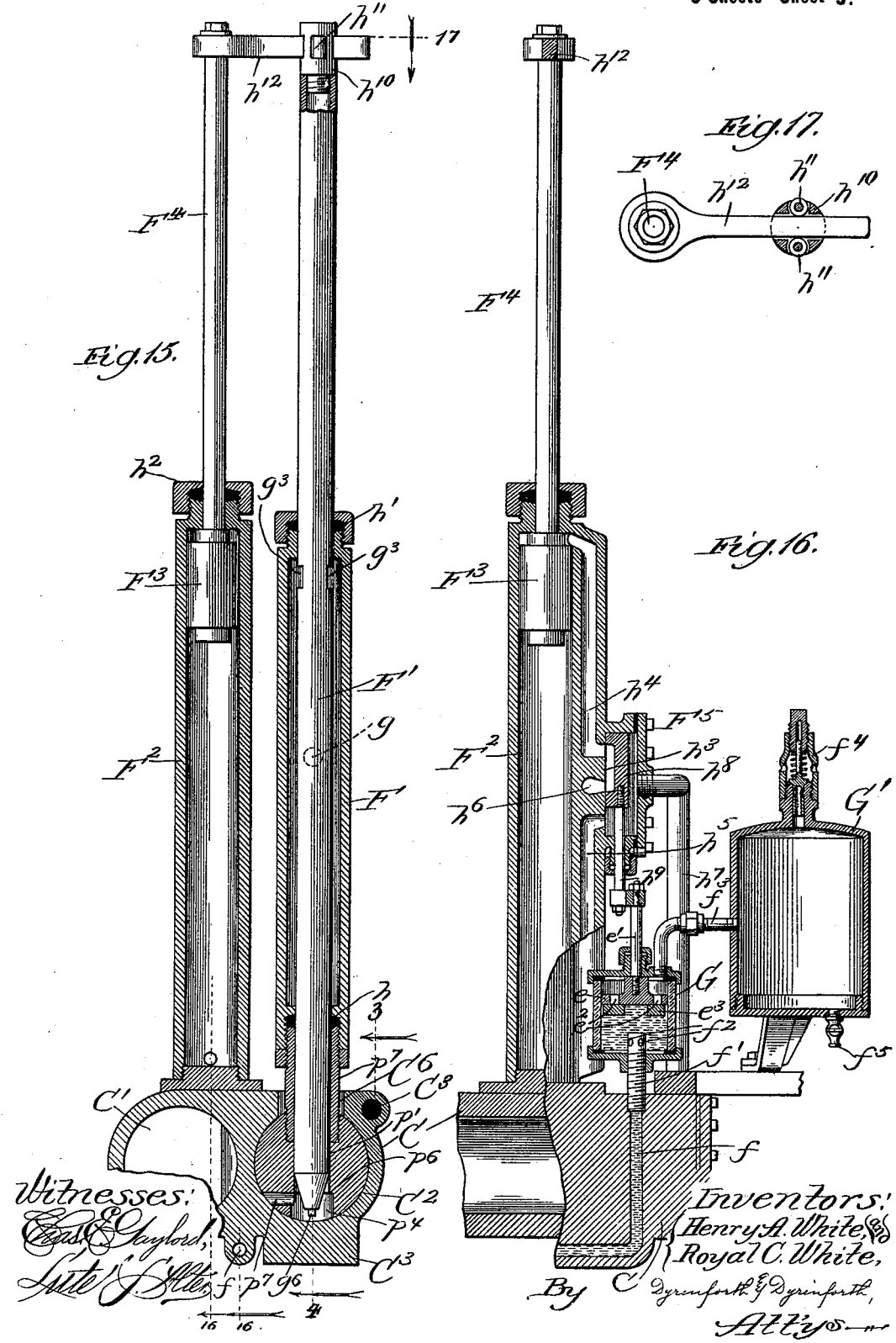

No. 656,278. Patented Aug. 21, 1900.
H. A. & R. C. WHITE.
FILLING MACHINE.
(Application filed Apr. 20, 1896.)
(No Model.) 8 Sheets—Sheet 6.
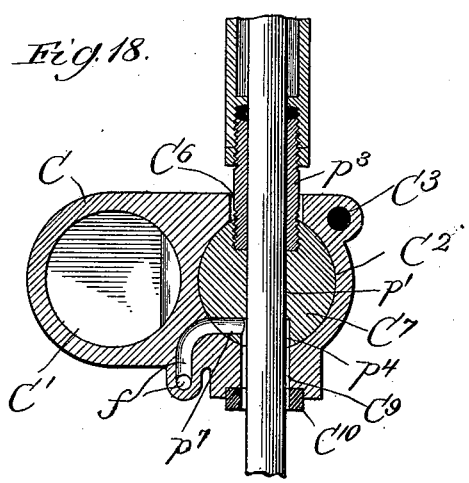
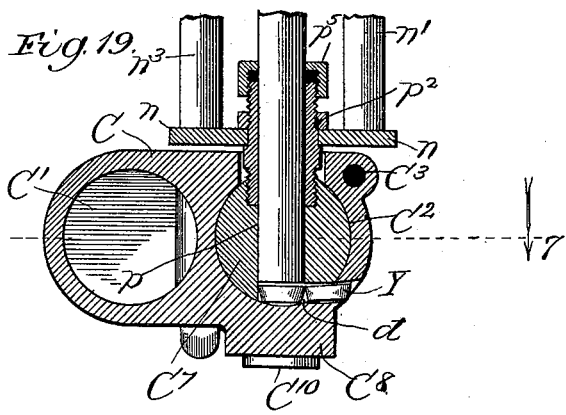
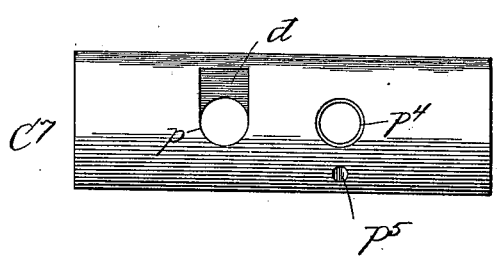
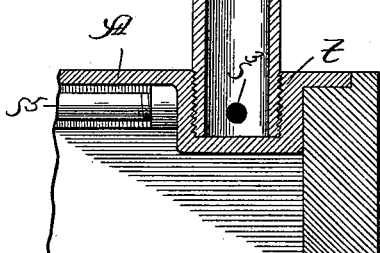
Witnesses:
Inventors:
Henry A. White,
Royal C. White,
By Dyrenforth & Dyrenforth,
Att'ys

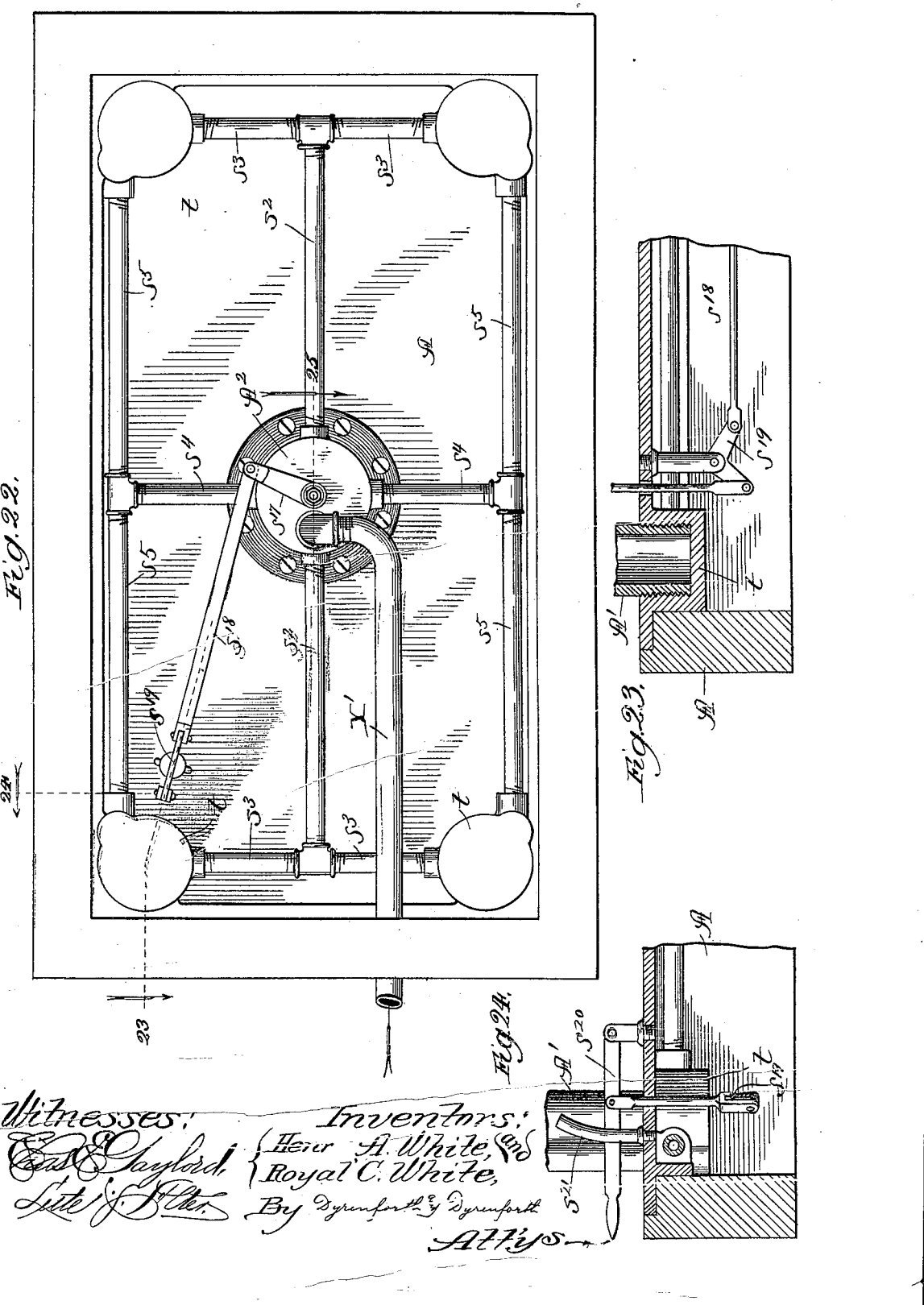

No. 656,278. Patented Aug. 21, 1900.
H. A. & R. C. WHITE.
FILLING MACHINE.
(Application filed Apr. 20, 1898.)
(No Model.) 8 Sheets—Sheet 8.

Witnesses:

Inventors:
Henry A. White,
Royal C. White,
By Dyrenforth & Dyrenforth,
Att'ys

UNITED STATES PATENT OFFICE.

HENRY A. WHITE, OF CHICAGO, AND ROYAL C. WHITE, OF GENESEO, ILLINOIS; SAID HENRY A. WHITE ASSIGNOR TO SAID ROYAL C. WHITE.

FILLING-MACHINE.

SPECIFICATION forming part of Letters Patent No. 656,278, dated August 21, 1900.

Application filed April 20, 1896. Serial No. 588,308. (No model.)

*To all whom it may concern:*

Be it known that we, HENRY A. WHITE, residing at Chicago, in the county of Cook, and ROYAL C. WHITE, residing at Geneseo, in the county of Henry, State of Illinois, citizens of the United States, have invented a new and useful Improvement in Filling-Machines, of which the following is a specification.

Our invention relates to improvements in machines for filling barrels or other packages with liquids, and more especially in machines or apparatus for use in breweries for filling barrels or kegs with beer.

Our object is to provide apparatus of generally-improved construction which shall operate to fill packages without exposing the liquid during any part of the operation to the surrounding atmosphere, thus avoiding waste either of the liquid or gaseous contents thereof when present, which shall prevent foaming of beer or other charged liquids while being poured into the package, and thus permit the package to be thoroughly filled, and which shall, furthermore, be comparatively quick and to a large extent automatic in its operation and of a particularly mechanical and durable construction.

Figure 25:
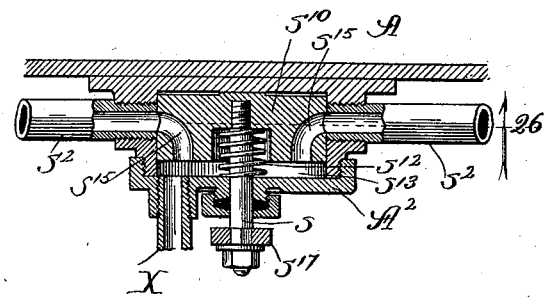

In the drawings, Figure 1 is a front elevation of our improved apparatus with certain parts broken away; Fig. 2, a broken sectional detail view, on a larger scale than Fig. 1, of a cylinder and a cylindrical piston therein carrying a filling-tube and a plunger or bung-driver, the parts being shown in one position and the section being taken on line 2 of Fig. 6 viewed in the direction of the arrow; Fig. 3, a broken sectional detail view of the cylinder and certain attendant parts, the section being taken on line 3 of Fig. 15 in the direction of the arrow; Fig. 4, an enlarged broken sectional view of the carrier-piston and lower end of the filling-tube, taken on line 4 of Fig. 15 and showing the filling-tube valve closed; Fig. 4ª, a view the same substantially as Fig. 4, but showing the valve open; Fig. 5, a view of the same nature as Fig. 2 and showing the moving parts in another position; Fig. 6, a plan section taken on the crooked line 6 of Fig. 1 and enlarged; Fig. 7, a plan section of the cylinder and an air-chest with the carrier-piston in place, the section being taken on line 7 of Figs. 3 and 19; Fig. 8, a view, partly in elevation, with parts broken away, and partly in section, taken on lines 8 8 in Fig. 6, showing the bung or stopper driving mechanism; Fig. 9, a broken section taken on line 9 of Fig. 8; Fig. 10, a plan section taken on line 10 of Fig. 8 and showing certain details only; Fig. 11, an enlarged perspective view of a wedge-block; Figs. 12 and 13, enlarged and broken perspective views of details of construction; Fig. 14, an enlarged section taken on line 14 of Fig. 10, showing a spring-catch detail; Fig. 15, a broken section taken on line 15 of Fig. 6 and showing the filling-tube and its raising and lowering means; Fig. 16, a broken section taken on line 16 of Fig. 6 corresponding with the two lines 16 16 in Fig. 15; Fig. 17, a plan section taken on line 17 of Fig. 15; Fig. 18, a broken section taken on line 18 of Fig. 5; Fig. 19, a broken section taken on line 19 of Fig. 5; Fig. 20, a bottom plan view of the cylindrical carrier-piston; Fig. 21, a broken section taken on line 21 of Fig. 6; Fig. 22, a bottom plan view of the platform which supports the apparatus; Figs. 23 and 24, sections taken, respectively, on lines 23 and 24 of Fig. 22; Fig. 25, an enlarged broken section taken on line 25 of Fig. 22, and Fig. 26 a broken section taken on line 26 of Fig. 25.

A is a platform from the four corner portions of which rise hollow supporting columns or tubes A'. As shown in Fig. 21, the tubes A' are screwed into cup-shaped sockets $t$ in the platform A and are closed at their tops with screw-caps $s$. The tubes A' afford cylinders and are provided between their ends with vertical slots $s'$.

Figure 26:
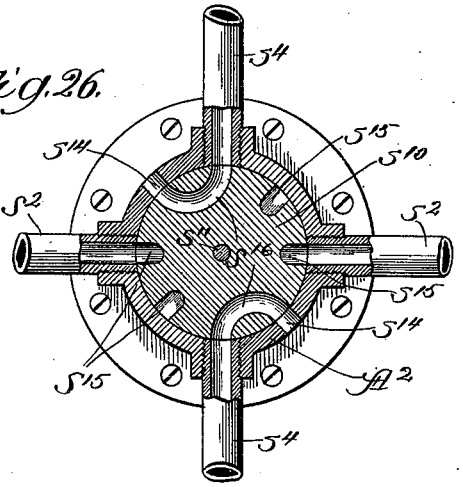

X, Fig. 1, is a compressed-air-supply pipe. Most breweries have an air-compressor which supplies compressed air for various purposes, such as back-pressure bunging, and in the present instance the pipe X would communicate with such a compressor or compressed-air reservoir to convey air to the apparatus under a pressure of from ten to fifteen pounds to the square inch. Extending from the pipe X is a branch pipe X', (see Fig. 22,) communicating with a valve-chamber A² at the center and under side of the platform A. (See Figs. 25 and 26.) In opposite sides of the chamber $A^2$ in the direction longitudinally of the platform are ports communicating with pipes $s^2$, which through branch pipes or passages $s^3$ communicate with the lower ends of the columns $A'$. In opposite sides of the chamber $A^2$, in the direction transversely of the platform, are ports communicating with pipes $s^4$ $s^4$, having branch pipes $s^5$. The branch pipes $s^5$ communicate with vertical pipes $s^6$, (see Fig. 1,) which extend parallel with the columns $A'$ and enter the latter at their upper ends. In each column or cylinder $A'$ is a vertically-movable supporting-piston or piston mechanism comprising a rod $s^7$, provided at its upper end, above the slot $s'$, with a piston $s^8$ and at its lower end, below the slot $s'$, with a piston $s^9$. In the chamber $A^2$ is a rotary valve $s^{10}$ on a stem $s^{11}$, which extends through a stuffing-box in the lower end of the shell of the chamber $A^2$, as shown in Fig. 25. Surrounding the stem $s^{11}$ and confined between the base of the chamber and under side of the valve $s^{10}$ is a spring $s^{12}$, which tends to press the valve against the upper side of the chamber and maintain a space $s^{13}$ below the valve. In opposite sides of the valve-chamber $A^2$ in the position shown in Fig. 26 are exhaust-ports $s^{14}$ $s^{14}$. In the valve are four passages $s^{15}$, extending from the chamber $s^{13}$ at the under side of the valve into position to register alternately as the valve is turned with the ports or pipes $s^2$ $s^4$, and the valve is also provided with passages $s^{16}$, adapted to register alternately with the pipes $s^2$ $s^4$ and bring about communication between them and the adjacent exhaust-ports $s^{14}$. On the stem $s^{11}$ of the valve is a crank $s^{17}$, connected, by means of a rod $s^{18}$ and bell-crank lever $s^{19}$, with an operating-lever $s^{20}$, (see Fig. 24,) which may be raised and lowered in a guide $s^{21}$ on the platform. Connected with the rods $s^7$ are brackets or cross-heads B, which support the filling and bung-driving apparatus, hereinafter described. The ends of the brackets slide in the slots $s'$ of the columns, and on the brackets are bracing or steadying arms B′, which slide upon the outer surfaces of the columns.

When the operating-lever $s^{20}$ is lowered to the position shown in Figs. 1 and 24, the valve is turned to the position shown in Figs. 25 and 26, causing compressed air from the supply-pipe X to pass into the pipes $s^2$ and branch pipe $s^3$ to the lower ends of the cylinders or columns A′, whereby the supporting-pistons are raised until the brackets B strike the upper ends of the slots $s'$ to sustain the parts in the elevated position shown in Fig. 1. As air is forced into the lower ends of the columns A′ the air above the pistons $s^8$ vents through the pipes $s^6$ $s^5$ $s^4$ and passages $s^{16}$ out at the ports $s^{14}$. When the lever $s^{20}$ is raised to the top of the guide $s^{21}$, the valve $s^{10}$ is turned to move supply-passages $s^{15}$ into coincidence with the ports or passages $s^4$ and cause the passages $s^{16}$ to open communication between the ports or pipes $s^2$ and outlets $s^{14}$. This operation causes the air in the columns below the pistons $s^9$ to escape and compressed air to enter through the pipes $s^4$ $s^5$ $s^6$ to the columns above the pistons $s^8$. As air is vented from beneath the piston $s^9$ the brackets B and parts carried thereby descend toward or to the lower ends of the slots $s'$, and the air forced into the tops of the columns will hold the parts down under pressure.

Mounted upon the supporting-brackets B is a shell or casing or filling-head C, containing two parallel chambers, one of which affords a compressed-air chest C′ and the other a piston-cylinder $C^2$. At one end of the air-chest C′ is a pipe or hollow projection $r$, which is coupled to a hose $r'$, extending from a branch $X^2$ of the air-supply pipe X. The flexible hose connection $r'$ is provided to permit raising and lowering of the shell C without obstruction therefrom. Cored in the shell C is a passage $C^3$, which at one end terminates in a port $q$ at one end of the piston-chamber $C^2$ and at its opposite end terminates at a port $q'$ in a seat $q^2$ in a valve-chamber $C^4$ on the shell. In the seat $q^2$ is a port $q^3$, opening into the piston-chamber $C^2$ at the end thereof opposite the port $q$, and in the seat between the ports $q'$ $q^3$ is an exhaust-port $q^4$. Extending from the air-chest C′ to the upper side of the valve-chamber $C^4$ is a pipe $C^5$. In the valve-chamber and sliding upon the seat $q^2$ is a valve $q^5$, having a stem $q^6$, which works through a stuffing-box in the end of the chamber and is connected with an operating-handle $q^7$, fulcrumed at $q^8$ upon the shell. In the upper side of the piston-chamber $C^2$ is a longitudinally-extending slot $C^6$. Sliding in the chamber $C^2$ is a cylindrical piston or carrier $C^7$. On the under side of the shell below the piston-cylinder and extending longitudinally thereof is a projection $C^8$, presenting a flat bearing-surface. At the center of the under side of the cylinder is a vertical opening $C^9$, surrounded at its lower end by a preferably rubber ring or seal $C^{10}$.

Extending through the carrier-piston $C^7$ are vertical guide-openings $p$ $p'$, in the upper ends of which are fastened guide-sleeves $p^2$ $p^3$, respectively, which project through the slot $C^6$. The lower end of the opening $p'$ is slightly enlarged to produce a chamber $p^4$. When the piston $C^7$ is moved to cause the sleeve $p^3$ to contact with the end of the slot $C^6$, (the position shown in Fig. 2,) the opening $p$ registers exactly with the opening $C^9$, and when the piston is moved to the position wherein the sleeve $p^2$ contacts with the opposite end of the slot $C^6$, as in Fig. 5, the opening $p'$ at its chambered portion $p^4$ registers exactly with the opening $C^9$.

Fastened rigidly upon the sleeve $p^2$ is a frame D, comprising a base-plate $n$, having a central opening to receive the said sleeve and four standards $n'$ $n^2$ $n^3$ $n^4$, respectively.

D′ is a plunger or bung-driving pin working through a stuffing-box $p^5$ at the top of the sleeve $p^2$ and through the said sleeve and the opening $p$. The upper end portion of the plunger $D'$ is provided on opposite sides with teeth-affording racks $m\ m$. Fastened upon the tops of the standards is a fluid-motor comprising a vertical cylinder or piston-chamber $D^2$, closed at its upper end and containing a piston $D^3$ on a vertical stem $D^4$, which works through a stuffing-box in the lower end of the cylinder. On the side of the cylinder $D^3$ is a valve-chamber $D^5$, containing a valve-seat provided with ports $l\ l'$, leading to the upper and lower ends, respectively, of the cylinder and an intermediate exhaust-port $l^2$. In the chamber $D^5$ is a slide-valve $l^3$ on a downwardly-extending stem $l^4$, which works through a stuffing-box in the lower end of the said chamber. In the outer side of the chamber $D^5$ is an inlet-port communicating with an air-supply pipe $l^5$, which extends thereto from the pipe $C^5$. Movement of the valve $l^3$, as hereinafter described, upward to the position shown in Fig. 9 causes compressed air to enter the cylinder $D^2$ through the port $l'$ and an exhaust to take place through the ports $l\ l^2$, whereby the piston $D^3$ and its stem $D^4$ are raised to the position shown in Figs. 8 and 9, while downward movement of the valve causes compressed air to enter above the piston and the lower end of the cylinder to exhaust, whereby the piston and its stem are lowered.

$D^6$ is toggle mechanism comprising links $m'$, pivotally connected at their upper ends to the stem $D^4$ and at their lower ends to the long arms of levers $m^2$. The levers $m^2$ are fulcrumed between their ends upon pins $m^3$, fastened to the standards, and the ends of their short arms are formed into segmental toothed gears $m^4$, which mesh with the racks $m$. The toggle mechanism operates to raise the plunger $D'$ when the piston $D^3$ descends and to drive the plunger downward when the said piston rises.

$D^7$ is an operating-lever for the slide-valve $l^3$, pivotally connected with the lower end of the stem or rod $l^4$. At one side of the rod $l^4$ the lever extends through a vertical guide-loop $n^5$ on the standard $n'$, beyond which it carries a handle $k$, and at the opposite side of said rod the lever is pivotally secured to the standard $n^3$ at $n^6$. Beyond the standard $n^3$ the lever is formed with a downward-projecting part $k'$ and a laterally-projecting lug $k^2$. (See Fig. 12.) A spring $k^3$ on the standard $n^3$ bears downward upon the adjacent end of the lever $D^7$ and tends to maintain the handle portion $k$, rod $l^4$, and valve $l^3$ raised.

E is a sustaining-guide for the rear end of the lever $D^7$, comprising a bar $i$, mounted parallel with the slot $C^6$ on the shell C. Pivoted to the end of the bar $i$ is a backwardly-swinging extension or stop $i'$, held normally in its forward position in line with the bar $i$ by a spring $i^2$, fastened to the bar. The upper forward corner of the bar $i$ is recessed to afford a guideway $i^3$, and the said guideway registers with a gradually-diminishing recess in the pivotal extension $i'$, affording a cam $i^4$.

On one side of the lever $D^7$ is a laterally-projecting shoulder or stop $k^4$, and extending loosely through the adjacent lever $m^2$, near the toothed end $m^4$ thereof, is a pin or stop $m^5$, provided with a spring $m^6$, which tends to project the pin at its outer end into the path of the shoulder $k^4$. On the inner end of the pin is a head $m^7$, presenting an inclined face $m^8$ at the side adjacent to the lever $m^2$. Fastened against the upper end portion of the plunger $D'$ is a wedge $m^9$, which may be a round block, as shown, sharpened circumferentially to produce the wedge-surface $m^{10}$. The wedge is fastened in place by means of a screw $m^{11}$. In the movement of the plunger $D'$ as the wedge passes the pin $m^5$ it enters between the head $m^7$ and lever $m^2$ and retracts the pin to withdraw it to the position shown in Fig. 10 out of the path of the lever $D^7$, as hereinafter described.

Fastened upon the sleeve $p^3$ is a vertical tube or cylinder F, provided at its lower and upper ends with stuffing-boxes $h\ h'$, respectively.

$F'$ is a filling-tube extending longitudinally through the cylinder F and working through the stuffing-boxes $h\ h'$ and opening $p'$ in the carrier-piston $C^7$. Mounted upon the shell C is a fluid-motor comprising a vertical tube or cylinder $F^2$, closed at its lower end and containing a piston $F^3$, provided with a stem $F^4$, which moves through a stuffing-box in the top of said cylinder. On the side of the cylinder $F^2$ is a valve-chamber $F^5$, Fig. 16, containing a valve-seat $h^3$, provided with ports $h^4\ h^5$, which lead to the upper and lower ends, respectively, of the cylinder $F^2$ and an intermediate exhaust-port $h^6$. Extending to the chamber $F^5$ from the air-chest $C'$ is an air-supply pipe $h^7$. In the chamber $F^5$ is a slide-valve $h^8$, which when raised directs pressure to the lower end of the cylinder $F^2$ and exhausts the upper end thereof to raise the piston $F^3$ and which when lowered reverses the operation. The slide-valve $h^8$ is upon a stem $h^9$, which works through a stuffing-box in the lower end of the chamber.

The upper end of the filling-tube $F'$ is closed by means of a pivotal screw-cap $h^{10}$, provided with an opening extending horizontally through it and flanked by antifriction-wheels $h^{11}$, Fig. 17. Pivotally secured to the upper end of the piston rod or stem $F^4$ is a horizontally-swinging finger $h^{12}$, which extends loosely through the opening in the cap $h^{10}$, between the wheels $h^{11}$. The finger $h^{12}$ causes the filling-tube to ascend and descend with the piston $F^3$, and in the movement of the carrier-piston $C^7$ and consequent horizontal movement of the filling-tube the cap portion of the latter turns and slides upon the finger $h^{12}$, and the said finger turns upon the rod $F^4$. In the side of the cylinder F is an inlet-opening $g$, provided with a tubular projection $g'$, for the reception of a pipe $g^2$, which leads thereto from a beer or other liquid supply.

The filling-tube F' is provided between its ends with inlet-openings $g^3$ $g^3$, communicating with the cylinder F, and in the lower end of the tube is a downwardly-tapering screw-plug $g^4$. (See Fig. 4.) The upper end of the plug forms a seat for a valve $g^5$ upon a stem $g^6$, which extends normally through and beyond the lower end of the plug. The stem $g^6$ has a longitudinal slot $g^7$, through which loosely extends the shank portion $g^8$ of a pin F$^6$. On one end of the pin F$^6$ is a head or enlarged cylindrical part $g^9$, movable in an opening in one side of the plug and capable of entering the slot $g^7$. The opposite end of the pin extends through an opening in the side of the plug and is beveled to afford a cam $g^{10}$. A spring $g^{11}$ in a chamber $g^{12}$ at one side of the plug presses the pin in the direction to the right in Figs. 4 and 4$^a$, whereby when the valve is raised, as shown in Fig. 4$^a$, the head $g^9$ enters the slot $g^7$ and holds the valve open. In the rise of the filling-tube from a package, as hereinafter described, the cam end $g^{10}$ of the pin strikes a shoulder $p^6$, formed by the top of the chamber $p^4$, and moves the pin to the left against the resistance of the spring, whereby the head $g^9$ is withdrawn from the slot $g^7$ and the valve $g^5$ closes. In the side of the plug, below the valve-seat, is an outlet-opening $g^{13}$. In practice the downward pressure of liquid in the tube F' tends to maintain the valve closed, while pressure against the lower end of the stem $g^6$ lifts the valve and permits the liquid to escape through the outlet $g^{13}$.

In the piston C$^7$ and extending from the chamber $p^4$ out through the side thereof is a vent-passage $p^7$, which registers with the mouth of a passage $f$ when the chamber $p^4$ registers with the opening C$^9$. The passage $f$ is cored in the shell C, extending first downward, as shown in Figs. 8 and 18, then horizontally and longitudinally of the shell, and then upward through the top of the shell. (See Fig. 16.) Screwed into the outer end of the passage $f$ is a tube $f'$, provided in its upper end with outlets $f^2$, opening into the lower end of a vent-chamber or cylinder G, the circumferential wall of which may be of glass. At the side of the cylinder G is a back-pressure chamber G' of desired size, which communicates with the upper end of said cylinder through a pipe $f^3$. At the top of the chamber G' is a vent-valve $f^4$, and at the lower side thereof is a draw-off cock $f^5$. In the cylinder G is a piston or movable abutment $e$, having a stem $e'$, which works through a stuffing-box in the top of the cylinder and is connected at its top with the lower end of the valve-stem $h^9$. Extending through the piston $e$ is an annular series of openings $e^2$, which are opened and closed by a ring or float valve $e^3$, of cork or the like, in the chamber below the piston.

In the under side of the piston C$^7$, at the side of the opening $p$, is a recess $d$, which registers with a bung or stopper-feed opening $d'$ through the side of the shell C when the opening $p'$ registers with the opening C$^9$.

Secured upon the platform A, below the shell C, is a barrel or package holding frame H H'.

In operation the pipe X is connected with the compressed-air supply, as before stated, whereby the air-chest C' is charged with compressed air, and, presuming that the apparatus is to be employed in filling barrels or kegs with beer, the pipe $g^2$ is connected with the beer-supply. Initially the apparatus will be in the position shown in Fig. 1. A barrel is rolled upon the barrel-support H' and centered at its bung-hole below the plunger D'. The lever $s^{20}$ will then be turned to turn the valve $s^{10}$ on the under side of the platform to vent pressure from the lower ends of the columns A' and direct pressure into the upper ends thereof, whereby the brackets B and parts carried thereby will be lowered until the cushion-ring or seal C$^{10}$ rests and presses firmly down upon the barrel about the bung-hole, producing an air-tight joint. The lever D$^7$ is then pressed down at its handle portion $k$, whereby the projection $k^2$ on the rear end portion of the lever will rest upon the upper surface of the bar extension $i'$. This lowering of the lever D$^7$ pulls the valve $l^3$ down to the lower end of the chamber D$^5$, causing compressed air from the pipe $l^5$ to be directed against the upper end of the piston D$^3$, in the cylinder D$^2$, forcing the piston downward and turning the toggle mechanism to raise the plunger D' to the position shown in Fig. 5. The operating-lever $q^7$ is then turned to move the slide-valve $q^5$ in the valve-chamber C$^4$ and direct air under pressure from the pipe C$^5$ through the passage C$^3$ and port $q$ against the end of the piston C$^7$, and thus force the latter to the left, which is the position shown in Fig. 5, wherein the chamber $p^4$ registers with the opening C$^9$ and the bung-receiving chamber $d$ registers with the bung-feed opening $d'$. At the same time the passage $p^7$ in the valve C$^7$ will register with the mouth of the cored passage $f$, whereby the contents of the chamber or lantern G will drain out from below the float $e^3$ and piston $e$ to the barrel, causing the piston $e$ to descend under the back pressure in the chamber G' and draw down the valve $h^8$ in the chamber F$^5$. This movement of the valve $h^8$ causes air to be directed into the upper end of the cylinder F$^2$ and exhausted from the lower end thereof, whereby the piston F$^3$ and its rod or stem F$^4$ are moved downward, thereby moving the filling-tube F' downward through the opening C$^9$ and to the bottom of the barrel, with which latter the stem $g^6$ contacts to open the outlet-valve $g^5$. Beer from the pipe $g^2$ passing into the tube or cylinder F and thence through the openings $g^3$ into the filling-tube F' escapes through the outlet $g^{13}$ to the barrel. The venting of the barrel takes place around the filling-tube F', which is of smaller diameter than the opening $C^9$ to the chamber $p^4$, thence through the port $p^7$ and cored passage $f$ to the vent-chamber or lantern G. The float $e^3$ being out of contact with the piston $e$, the air forced from the barrel passes through the openings $e^2$ in the said piston and through the pipe $f^3$ to the chamber G and out through the vent-valve $f^4$. The chamber G' should be originally charged with compressed air to the desired bunging pressure and the vent-valve $f^4$ should be set to effect sufficient back pressure in the barrel to prevent foaming of the beer as it enters the latter. When the barrel is filled to the top, the beer which flows in thereafter escapes through the passages $p^7 f$ to the lantern or chamber G and raises the float $e^3$ to close the openings $e^2$ through the piston and raise the latter to slide the valve $h^8$ in the upward direction to the position shown in Fig. 16. This movement of the valve directs pressure against the under side of the piston $F^3$ and vents pressure from the upper side of the cylinder or tube $F^2$, whereby the piston $F^3$, its stem $F^4$, and the filling-tube F' are raised until the lower end of the latter is withdrawn into the piston $C^7$. When the filling-tube valve is initially opened, the head $g^9$ of the pin $F^6$ enters the slot $g^7$ in the valve-stem, and as soon as the filling-tube commences to rise from the lower end of the barrel the upward pressure against the valve-stem or pin $g^6$ is released and the valve $g^5$ is held open by the head $g^9$ of the pin $F^6$ until the filling-tube is withdrawn from the barrel and the pin is moved by engagement of its cam end $g^{10}$ with the shoulder $p^6$. The lever $q^7$ is then turned to direct pressure into the cylinder $C^2$ through the port $q^3$, whereby the piston $C^7$ is moved to the right to the initial position shown, for example, in Figs. 2 and 3. The projection $k^2$ on the lever $D^7$ slides in the guide-recess $i^3$ of the rod $i$, and the part $k'$ rests and slides on the upper surface of the said rod. In the movement of the piston $C^7$ from the position shown in Fig. 5 to that shown in Fig. 2 the projection $k^2$ on the lever $D^7$ engages the cam-face $i^4$ on the hinged extension $i'$ of the guide-bar $i$ and swings the latter outward against the resistance of the spring $i^2$. As soon as the projection or shoulder $k'$ has passed the end of the hinged extension $i'$ the lever $D^7$ is pressed downward at its end portion carrying the projection $k^2$ by means of the spring $k^3$ to raise the rod $l^4$ and slide-valve $l^3$. This movement causes compressed air to be directed into the cylinder $D^2$ below the piston $D^3$ and to be exhausted from the upper side of the said piston, whereby the latter is driven upward and, through the toggle mechanism $D^6$, drives the plunger-bar D' downward. When the piston $C^7$ is in the position shown in Fig. 5, the recess or chamber $d$ by registering with the opening $d'$ permits a bung or stopper Y to be fed into the lower end of the passage $p$, as shown in Fig. 19, whereby the bung is carried by the piston $C^7$ to the opening $C^9$, and in the descent of the plunger D' is engaged and driven into the bung-hole of the barrel. As the plunger or bung-driver D' is raised from the position shown in Fig. 8, as before described, the wedge $m^9$ engages the head $m^7$ of the spring catch or pin $m^5$ and withdraws the latter, as shown in Fig. 10, whereby it will pass the shoulder $k^4$ on the lever $D^7$ and then releases it. Thus when the plunger is in its raised position (shown in Fig. 5) the spring-catch projects over the shoulder $k^4$. In the descent of the plunger to drive a stopper, as described, the spring-catch $m^5$ engages the shoulder $k^4$ and swings the lever at its long arm downward to draw down the rod $l^4$ and slide-valve $l^3$ to cut off the flow of compressed air to the under side of the piston $D^3$. This cut-off mechanism operates in practice to cause the slide-valve $l^3$ to close the ports $l' l$ just as the lower end of the plunger D' arrives flush with the under surface of the ring or cushion $C^{10}$. Thus the force of the descending plunger D' is checked just as the bung is driven home in the bung-hole of the barrel. When the apparatus is lifted from the barrel, the expansion of the air in the chamber $D^2$ below the piston $D^3$ will raise the said piston and cause the plunger D' to descend to the position shown in Fig. 1, where it operates to center or position the next barrel to be filled. In the final descent of the plunger D' after the removal of the barrel the spring-catch $m^5$, which moves in the arc of a circle, slides off of the end of the shoulder $k^4$ and releases the lever $D^7$. This permits the spring $k^3$ to turn the lever and raise the valve $l^3$, whereby the plunger D' is held firmly down in its barrel-centering position.

The cut-off mechanism for the plunger D' is a very desirable feature of our improvements as it causes the bung to be driven just far enough and no farther into the bung-hole than is desired. The distance to which the plunger may be driven downward under direct air-pressure may be shortened by shortening the rod $l^4$, which may be done by first loosening the set-screw $z$, Fig. 1, so that the valve $l^3$ will never rise to the top of the chamber $D^5$, and consequently a shorter engagement of the pin $m^5$ with the lever $D^7$ will produce closing of the port $l'$.

While it is desirable to provide a barrel holder or support like the holder H H' shown in the drawings, any kind of support which will hold the barrel when the shell C descends upon it will answer our purpose.

The centering or positioning of the mouth or bung-hole of a package or barrel by means of the bung-driving plunger is important in practice, as it insures a proper positioning of the barrel or package, obviating all danger of damage to the filling-tube and economizes movements and therefore time. When a barrel is placed upon the holder, the latter may be slid longitudinally upon its rollers $b$ and turned upon the holder to register at its bung-hole with the plunger, which latter descends into the bung-hole as the apparatus is lowered into position. By this means the positioning of the barrel may be performed very quickly and always exactly. As before described, the bung is received by the carrier-piston while the filling operation is being performed and is then moved by the piston into position to be driven. Thus from the time the filling-tube is withdrawn until the bung is driven the contents of the barrel are not exposed to the surrounding atmosphere or the pressure thereon relaxed. As even momentary opening of the bung-hole or relaxation of pressure thereon causes a material waste of charged liquid our improvements, which obviate this difficulty, are of great importance. In the event that the operator should neglect to feed a bung Y and no bung should be in position to be driven by the plunger when it descends the latter will descend into the bung-hole under the expansion of the air in the cylinder $D^2$ and by the distance of its descent indicate that no bung has been driven.

The carrier-piston $C^7$ in practice conforms very closely to the wall of the cylinder or piston-chamber $C^2$, so that while it will slide readily no gas can escape around the piston during the filling operation. Hitherto carriers in the form of plates or blocks have been mounted upon supporting or sealing plates to slide from one position to the other; but owing to the upward pressure of the gas it has been a matter of great difficulty to so mount the carrier that it will move with desired ease upon the support and at the same time rest so firmly thereon against the gas-pressure as to maintain a gas-tight joint. Our improved construction completely overcomes this difficulty.

The raising and lowering feature of our apparatus permits the latter to be quickly and easily adjusted to any size of package, and owing to the construction at the platform barrels may be rolled into position from one side and rolled from the opposite side when filled, thus producing a material saving in the time necessary for placing barrels in position.

Owing to the construction of the filling-tube and its outlet-valve, liquid will not commence to pour into the package until the tube has reached the lower end thereof. Thus the package is filled from its lower side, which tends to prevent splashing and foaming of the liquid in the event particularly that the back or bunging pressure is initially too low. As the filling-tube valve remains open until the tube is withdrawn from the package, all as described, liquid will enter and supply the quantity displaced by the tube, so that the package will be filled throughout when the tube is withdrawn.

While we prefer to construct our improved apparatus in all its parts substantially as shown and described, the construction may be variously modified without departing from the spirit of our invention as defined by the claims.

What we claim as new, and desire to secure by Letters Patent, is—

1. In a liquid-filling machine for breweries or the like, the combination with a source of fluid-pressure, of hollow columns, pistons in said columns simultaneously movable, filling and stopper-driving mechanisms, a support for said mechanisms operatively connected with the said pistons to be raised and lowered thereby, means for controlling the pressure whereby the support, and filler and driving mechanisms are automatically operated, and valve mechanism operative to direct the pressure equally to the columns and vent the pressure equally from the columns, substantially as and for the purpose set forth.

2. In a filling-machine for liquids, the combination with a holder for positioning the package to be filled, of a chamber having compressed-air supply and exhaust ports, a carrier-piston in the chamber, a vertically-reciprocatory filling-tube and a vertically-reciprocatory stopper-driver on the carrier-piston, means for connecting the chamber with a compressed-air supplier and for directing the pressure alternately into opposite ends of the chamber to reciprocate the carrier-piston and thereby move the said tube and driver alternately into alinement with the filling-opening of a positioned package, and reciprocating means for the tube and driver, substantially as and for the purpose set forth.

3. In a filling-machine for liquids, the combination with the source of fluid-pressure of the establishment for furnishing pressure for back-pressure bunging or the like, of a horizontal piston-chamber, a carrier-piston in the chamber, a vertically-reciprocatory filling-tube and a vertically-reciprocatory stopper-driver on the carrier-piston, the carrier-piston being movable to bring the said tube and driver alternately into alinement with the filling-opening of the positioned package, a stopper-receiver on the carrier-piston for holding a stopper in the path of movement of the said driver, and actuating means for the driver, substantially as and for the purpose set forth.

4. In a filling-machine for liquids, the combination of a support, having a piston-chamber and a guide-opening with which the filling-opening of a positioned package to be filled registers, a carrier-piston in the chamber, a filling-tube and a stopper-driver upon the carrier-piston and reciprocatory through openings in the carrier-piston, means for moving the carrier-piston to bring the said filling-tube and driver alternately into alinement with the said guide-opening, means for reciprocating the filling-tube and driver through the said guide-opening, a stopper-feed opening on the support, and a stopper-holding receptacle on the carrier-piston in the path of the vertical movement of the driver, the said receptacle in the movement of the carrier-piston registering alternately with the said stopper-feed opening and guide-opening, substantially as and for the purpose set forth.

5. In a filling-machine for liquids, the combination with a holder for positioning the package to be filled, of a casing above the said holder containing a piston-chamber, a valve-chamber provided with means for its connection with a compressed-fluid supplier and having ports leading to opposite ends of said piston-chamber, a valve in said valve-chamber movable to direct the fluid-pressure alternately into the opposite end portions of said piston-chamber, said piston-chamber having an elongated guide-slot in its upper side and a guide-opening in its under side, a carrier-piston in the piston-chamber, a reciprocatory filling-tube and a reciprocatory stopper-driver mounted in openings through the said piston, and laterally movable in the said guide-slot, and reciprocating means for the said tube and driver, the carrier-piston being movable in the chamber under the fluid-pressure to carry the said tube and driver alternately into alinement with the said guide-opening, substantially as and for the purpose set forth.

6. In a filling-machine for liquids, the combination of a casing, a chamber in the casing provided in its upper side with an elongated guide-slot, and in its under side with a guide-opening, a downward-projecting package-engaging seal on the casing about said guide-opening, a carrier-piston in the chamber, a vertically-reciprocatory filling-tube, and a vertically-reciprocatory stopper-driver, laterally movable in said guide-slot and mounted in and movable through vertical openings in said carrier-piston, the carrier-piston being movable to bring the said tube and driver alternately into alinement with said guide-opening, whereby they may reciprocate through said opening, substantially as described.

7. In a filling-machine for liquids, the combination with a holder for the package to be filled, of a carrier above the holder, a vertically-reciprocatory filling-tube and a vertically-reciprocatory stopper-driver on the carrier, the carrier being movable to bring the said tube and driver alternately into alinement with the filling-opening of a positioned package, and actuating means for the driver, operating to plunge the driver down to its bung-driving position and then lower the driver beyond said position, whereby the driver operates as a package-positioning medium, substantially as and for the purpose set forth.

8. In a liquid-filling machine for breweries or the like, the combination with the source of fluid-pressure of the establishment for supplying pressure for back-pressure bunging or the like, of the stopper-driver, a cylinder having pipe connection with the said source of fluid-pressure, a piston in the cylinder movable under said fluid-pressure and operatively connected with said driver, a stop on said driver, and cut-off mechanism for the piston-actuating fluid-pressure in the path of the said stop whereby in the driving movement of the stopper-driver the said stop actuates the cut-off mechanism, substantially as and for the purpose set forth.

9. In a liquid-filling machine for breweries or the like, the combination with the stopper-driver, of a cylinder connected with the fluid-pressure supplier of the establishment, a piston in the cylinder movable under said fluid-pressure and operatively connected with said driver, a stop on said driver, and adjustable cut-off mechanism, for the piston-actuating fluid-pressure, in the path of the said stop, whereby in the driving movement of the stopper-driver, the said stop actuates the cut-off mechanism, substantially as and for the purpose set forth.

10. The combination with the stopper-driver $D'$, operating-piston $D^3$ and piston-stem $D^4$, of the toggle mechanism $D^6$ comprising links $m'$, levers $m^2$ pivotally connected to the links, fulcrumed between their ends upon stationary supports and provided with segmental racks, and racks upon the said stopper-driver engaged by said segmental racks, substantially as and for the purpose set forth.

11. The combination of the stopper-driver $D'$, operating-piston $D^3$, toggle mechanism $D^6$ and valve $l^3$, of an operating-rod $l^4$ for said valve, a lever $D^7$ pivotally connected with said rod, a spring engaging the lever and holding the said rod and valve $l^3$ normally raised, a catch upon the toggle mechanism engaging said lever in the downward movement of the toggle mechanism to lower said rod and valve, and engaging means for said catch on the stopper-driver operating to withdraw the catch out of the path of the lever in the upward movement of the stopper-driver, substantially as and for the purpose set forth.

12. The combination with the carrier $C^7$, stopper-driver, piston operatively connected therewith, and valve $l^3$ movable to direct pressure against opposite sides of said piston, of the operating-lever $D^7$ for said valve, spring $k^3$ engaging said lever, and the stationary guide-bar E having the hinged extension $i'$, all constructed and arranged to operate substantially as and for the purpose set forth.

13. In a filling-machine for liquids, the combination with the carrier, the stopper-driver, stopper-driver-actuating mechanism and the operating-lever $D^7$, all constructed and arranged to operate substantially as described, of the stationary lever-guide E comprising the bar $i$, having the guide-recess $i^3$, swinging extension $i'$ having the cam $i^4$, and spring $i^2$ bearing against said extension, as and for the purpose set forth.

14. In a filling-machine for liquids, the combination with the filling-tube, guide therefor, and means for lowering and raising the tube in the guide, of a downwardly-seating valve in the lower end portion of the tube, a stem for said valve projecting beyond the end of the tube to be opened by contact with a surface of the package to be filled, a catch for said valve engaging and holding the same from its seat when open, and a catch-releasing stop on the guide in the path of the said catch, substantially as and for the purpose set forth.

15. In a filling-machine for liquids, the combination with the reciprocatory carrier provided with the guide-opening $p'$, filling-tube, and means for raising and lowering the tube through the said guide-opening, of a downwardly-seating valve $q^5$, in the lower end portion of said tube, having a stem $q^6$ projecting beyond the end of the tube, a pin $q^8$ mounted in the tube to extend through a slot in said stem and having a head, a spring operating normally to press the head into the said slot when the valve is raised, a cam on the end of the pin movable through the side of the tube under the action of the spring, and a stop at the said guide-opening in the path of said cam, operating, as the tube is raised at its lower end portion into said guide-opening, to engage the cam end of the pin and move the head out of engagement with the valve-stem, whereby the valve may close, substantially as described.

16. In a filling-machine for liquids, the combination, of a support, a carrier upon the said support, a vertically-reciprocatory filling-tube movable through the said carrier, a cylinder, a valve-chamber with means for its connection with a compressed-fluid supplier and having ports leading to the opposite ends respectively of said cylinder, a piston in the cylinder operatively connected with the said filling-tube, a slide-valve in said chamber movable to direct fluid-pressure alternately against opposite sides of said piston, and having a stem extending beyond said chamber, a vent-passage at the support for the package, a vent-chamber at said passage, a movable abutment in said vent-chamber, an air-passage affording communication between opposite sides of said abutment, a float in the chamber operating when raised to close the said air-passage and lift the abutment, the abutment being operatively connected with said valve-stem, whereby when liquid rises through the said vent-passage it lifts the float to close said air-passage and raise the abutment to slide the valve, substantially as and for the purpose set forth.

17. In a filling-machine for liquids, the combination, of a support, a carrier upon the said support, a vertically-reciprocatory filling-tube movable through the said carrier, a cylinder, a valve-chamber with means for its connection with a compressed-fluid supplier and having ports leading to the opposite ends respectively of said cylinder, a piston in the cylinder operatively connected with the said filling-tube, a slide-valve in said chamber movable to direct fluid-pressure alternately against opposite sides of said piston, and having a stem extending beyond said chamber, a vent-passage, at the support, for the package, a vent-chamber at said passage, a movable abutment in said vent-chamber, a back-pressure chamber communicating with the vent-chamber at the side of the abutment opposite the said vent-passage, an air-passage affording communication between opposite sides of said abutment, a float in the chamber operating when raised to close the said air-passage and lift the abutment, the abutment being operatively connected with said valve-stem, whereby when liquid rises through the said vent-passage it lifts the float to close said air-passage and raise the abutment to slide the valve, substantially as and for the purpose set forth.

HENRY A. WHITE.
ROYAL C. WHITE.

Witnesses:
CAMILLUS A. NASH,
JOHN D. NEW.